March 2, 1937.  E. L. FIX ET AL  2,072,583
LAMINATED GLASS
Filed Feb. 17, 1934
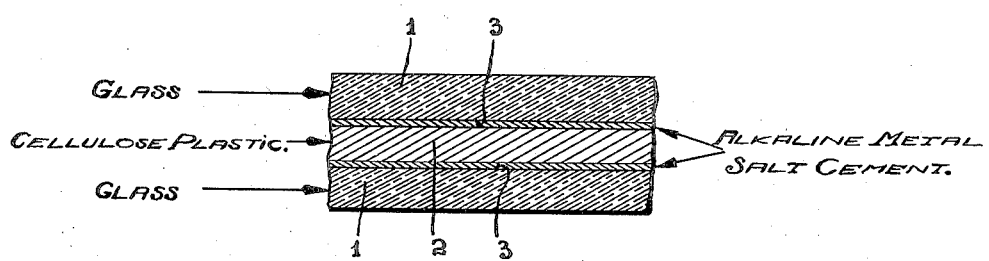
INVENTORS
EARL L. FIX. and
B. J. DENNISON.
BY
Bradley + Bee
ATTORNEYS.

Patented Mar. 2, 1937

2,072,583

UNITED STATES PATENT OFFICE 2,072,583

LAMINATED GLASS

Earl L. Fix, New Kensington, and Brook J. Dennison, Tarentum, Pa., assignors to Duplate Corporation, a corporation of Delaware Application February 17, 1934, Serial No. 711,698

3 Claims. (Cl. 49—92)

The invention relates to laminated glass which ordinarily comprises two sheets of glass cemented to the opposite sides of a sheet of cellulose plastic, such as cellulose acetate or ethyl cellulose. Very considerable difficulty is encountered in cementing the glass to cellulose acetate and to ethyl cellulose, and the invention is directed primarily to use with these materials, although the invention is applicable to use with other cellulose products, as hereinafter more fully set forth. In connection with certain of the plastics other than the acetate and ethyl cellulose, the use of the invention is of less importance, because of the availability of other satisfactory cements, such as gelatin and casein. The objects of the invention are the provision of a process and cementing medium, (1) which can be used under ordinary compositing conditions, namely at temperatures ranging from 240 degrees F. to 275 degrees F.; (2) which will give a product that under break tests shows results comparable with those now secured when cellulose nitrate is composited using gelatin as a cement; and (3) which shows good adhesion under continued exposure tests, such as are recognized and established in the art. A plate of laminated glass made in accordance with the invention is illustrated in the accompanying drawing, wherein:

The figure is a sectional view through the plate.

In the drawing, 1, 1 are sheets of glass; 2 is a sheet of cellulose plastic; and 3, 3 are layers of the cementing medium.

Briefly stated, the invention involves the use of certain salts of the alkali metals, such as sodium stannate, potassium stannate, ammonium stannate, and the like which are water soluble, or soluble in cellulose plastic solvents. These compounds, generally speaking, have, on ordinary examination, little or no adhesive properties, and show, when dissolved in water, little stickiness, such as is exhibited by standard adhesives, but when used between glass and cellulose ester plastic at a temperature upward of 200 degrees F. they become powerful cements.

The compounds may be mixed for use in various ways. For instance, they may be mixed with water alone or water and a high boiling solvent; they may be mixed with dope alone (and by dope is meant a mixture of plastic and a solvent for such plastic); or they may be mixed with both water and dope.

A specific example of a mixture which has given excellent results in adhering cellulose acetate is the following:

| | |
|---|---|
| Sodium stannate | 6.25 lbs. |
| Cellulose acetate flake | 42 lbs. |
| Acetone | 50 gals. |
| Diethyl phthalate | 5 gals. |
| Diacetone alcohol | 20 gals. |
| $H_2O$ | 25 gals. |

In compositing, the above mixture is placed on the glass sheets in a thin film, preferably by spraying, and allowed to dry, after which the glass is composited under heat and pressure in the usual way by the hydraulic method set forth in the Sherts and Hamill Patent No. 1,781,084, the pressure employed in the final pressing being about 150 lbs. per square inch, and the temperature being about 240 degrees F. It will be understood, however, that the invention is not limited as to the manner of applying the heat and pressure. It is possible to coat the glass sheets and heat them preliminary to the assembling with the plastic sheet and in pressing, the heated glass may supply the heat necessary so that no heat need be applied during the pressing operation. Other alkali metals may be used in the salt, such as potassium or ammonium, and instead of a stannate, the alkali metals may be combined to form a citrate, a phosphate, or a large number of other compounds. Following is a list of the compounds which may be used in the same manner as heretofore described in connection with the sodium stannate, the X which is used in connection with these compounds representing one of the group of alkali metals, sodium, potassium, or ammonium.

X-stannate
X-citrate
X-phosphate
X-arsenate
X-oxalate
X-bromide
X-molybdate
X-silicate
X-aluminate
X-chromate
X-antimonate
X-permanganate
X-vanadate The foregoing substitutes for the sodium stannate do not all operate to the same advantage as the sodium stannate, but they are all very effective as cements for cellulose acetate and ethyl cellulose and will make good commercial safety glass.

Various plasticizers may also be substituted for the diethyl phthalate, such as butyl cellosolve phthalate, carbitol phthalate, triacetin, ethyl meta-toluene sulphonamide, ethyl para-toluene sulphonamide, dibutyl carbonate, etc.

It is also possible to use the alkaline salt with water alone. Such compounds give good adhesion when composited at a temperature of 240 degrees F. and upwards. A specific example of a formula employed in the practice of the process using a metallic salt with water alone is as follows:

| | Grams |
|---|---|
| Sodium stannate | 2 |
| Water | 24 |

It will be understood that when the salt of the alkaline metal is used with water alone, the same variations may exist as to the character of the salt as heretofore given in connection with the use of such salts in connection with the dopes. That is, the compound may be a stannate, a citrate, a phosphate, or one of the compounds heretofore set forth and the alkaline metal in the salt may be sodium, potassium, or ammonium.

All of the foregoing with respect to compositing cellulose acetate also applies to compositing ethyl cellulose, either with water, solvents or dope, except that when dope is used, it requires ethyl cellulose flake in place of a cellulose acetate flake. The amount of the cellulose flake employed in the dope may vary within a considerable range without affecting the result materially. The foregoing further applies to the use of the cement in connection with reinforcing sheets of benzyl cellulose, cellulose propionate and cellulose propionate acetate. In each case when the cellulose dope is used, it contains a cellulose flake of the same composition as the cellulose sheet which is to be used as a reinforcing for the glass.

The salts of the alkaline metals may also be used in adhering cellulose nitrate. In such case, sodium silicate is preferably used in connection with the salt. The proportions preferably employed in this instance are—

| | Grams |
|---|---|
| Sodium stannate | 1 |
| Sodium silicate | .25 |
| Water | 98.75 |

Other soluble silicates, such as potassium silicate, may be substituted in the above formula for sodium silicate with substantially the same results. It will be understood also in this connection that the other forms of salts of alkaline metals as heretofore set forth may be used in place of the sodium stannate. The above formula is not only effective with cellulose nitrate, but may be used to advantage with other forms of cellulose plastic, such as ethyl cellulose, cellulose acetate, and benzyl cellulose. In many instances, the use of the sodium silicate in connection with the salt of the alkali metal adds materially to the results secured.

What we claim is:

1. A laminated plate comprising a pair of glass sheets cemented to the opposite sides of a sheet of cellulose plastic with a cement comprising a solution including water, cellulose derivative similar in composition to the plastic sheet, a solvent for the cellulose derivative, and one of the alkaline metal salts following: X-stannate, X-citrate, X-phosphate, X-arsenate, X-oxalate, X-bromide, X-molybdate, X-silicate, X-tungstate, X-aluminate, X-chromate, X-antimonate, X-permanganate, and X-vanadate, wherein X represents one of the alkaline metals.

2. A laminated plate comprising a pair of glass sheets cemented to the opposite sides of a sheet of cellulose acetate plastic with a cement comprising a solution including water, cellulose derivative similar in composition to the plastic sheet, a solvent for the cellulose derivative, and one of the alkaline metal salts following: X-stannate, X-citrate, X-phosphate, X-arsenate, X-oxalate, X-bromide, X-molybdate, X-silicate, X-tungstate, X-aluminate, X-chromate, X-antimonate, X-permanganate, and X-vanadate, wherein X represents one of the alkaline metals.

3. A laminated plate comprising a pair of glass sheets cemented to the opposite sides of a sheet of ethyl cellulose plastic with a cement comprising a solution including water, cellulose derivative similar in composition to the plastic sheet, a solvent for the cellulose derivative, and one of the alkaline metal salts following: X-stannate, X-citrate, X-phosphate, X-arsenate, X-oxalate, X-bromide, X-molybdate, X-silicate, X-tungstate, X-aluminate, X-chromate, X-antimonate, X-permanganate, and X-vanadate, wherein X represents one of the alkaline metals.

EARL L. FIX.
BROOK J. DENNISON.